United States Patent
Chaudhry et al.

(10) Patent No.: US 7,634,644 B2
(45) Date of Patent: Dec. 15, 2009

(54) EFFECTIVE ELIMINATION OF DELAY SLOT HANDLING FROM A FRONT SECTION OF A PROCESSOR PIPELINE

(75) Inventors: Shailender Chaudhry, San Francisco, CA (US); Quinn A. Jacobson, Sunnyvale, CA (US); Marc Tremblay, Menlo Park, CA (US)

(73) Assignee: Sun Microsystems, Inc., Menlo Park, CA (US)

( * ) Notice: Subject to any disclaimer, the term of this patent is extended or adjusted under 35 U.S.C. 154(b) by 176 days.

(21) Appl. No.: 11/534,125

(22) Filed: Sep. 21, 2006
(Under 37 CFR 1.47)

(65) Prior Publication Data
US 2007/0226475 A1 Sep. 27, 2007

Related U.S. Application Data

(60) Provisional application No. 60/781,640, filed on Mar. 13, 2006.

(51) Int. Cl.
*G06F 9/00* (2006.01)
(52) U.S. Cl. .................. 712/234; 712/233; 712/236
(58) Field of Classification Search ................. 712/233, 712/234, 236
See application file for complete search history.

(56) References Cited

U.S. PATENT DOCUMENTS

| | | | | |
|---|---|---|---|---|
| 5,509,130 | A * | 4/1996 | Trauben et al. | 712/215 |
| 5,799,164 | A * | 8/1998 | Sollars | 712/207 |
| 5,946,673 | A * | 8/1999 | Francone et al. | 706/13 |
| 5,946,674 | A * | 8/1999 | Nordin et al. | 706/13 |
| 5,987,588 | A * | 11/1999 | Popescu et al. | 712/23 |
| 6,128,607 | A * | 10/2000 | Nordin et al. | 706/13 |
| 6,308,319 | B1 * | 10/2001 | Bush et al. | 717/141 |
| 6,721,875 | B1 * | 4/2004 | McCormick et al. | 712/233 |
| 7,076,640 | B2 * | 7/2006 | Kadambi | 712/244 |
| 7,343,474 | B1 * | 3/2008 | Jordan et al. | 712/214 |
| 2002/0052926 | A1 * | 5/2002 | Bush et al. | 709/217 |
| 2004/0162972 | A1 * | 8/2004 | Iacobovici et al. | 712/239 |
| 2006/0242365 | A1 * | 10/2006 | Ali et al. | 711/137 |
| 2007/0101110 | A1 * | 5/2007 | Kishore et al. | 712/239 |

OTHER PUBLICATIONS

Dwight Sunada, David Glasco, Michael Flynn, "ABSS v2.0: A SPARC Simulator", Technical Report: CSL-TR-98-755, Apr. 1998.*
Bob Cmelik, David Keppel, "Shade: a fast instruction-set simulator for execution profiling"; ACM, May 16, 1994.*

* cited by examiner

*Primary Examiner*—Eddie P Chan
*Assistant Examiner*—Idriss N Alrobaye
(74) *Attorney, Agent, or Firm*—Gunnison, McKay & Hodgson, L.L.P.; Forrest Gunnison (57) ABSTRACT

Architectural techniques and implementations that defer enforcement of certain delayed control transfer instruction (DCTI) sequencing constraints or conventions to later stages of an execution pipeline are described. In this way, complexity of a processor pipeline front-end (including fetch sequencing) can be simplified, at least in-part, by fetching instructions generally without regard to such constraints or conventions. Instead, enforcement of such sequencing constraints and/or conventions may be deferred to one or more pipeline stages associated with commitment or retirement of instructions. Higher fetch bandwidth may be achieved in some realizations when, for example, DCTI couples are encountered in an execution sequence.

19 Claims, 5 Drawing Sheets

EFFECTIVE ELIMINATION OF DELAY SLOT HANDLING FROM A FRONT SECTION OF A PROCESSOR PIPELINE

CROSS-REFERENCE TO RELATED APPLICATION(S)

This application claims the benefit of U.S. Provisional Patent Application No. 60/781,640, filed Mar. 13, 2006.

BACKGROUND

1. Field of the Invention

The invention generally relates to the field of computers and, more particularly, to computer architecture.

2. Description of the Related Art

Processor instruction set architectures typically implement a variety of control transfer instructions (CTIs) including conditional and unconditional branches, calls, jumps, conditional traps, etc. In pipelined processor implementations, the execution of control transfer instructions can result in certain inefficiencies because instructions that follow a branch or other control transfer (in an expected or predicted execution sequence) may need to be flushed from the pipeline if the actual execution path diverges from that expected or predicted. In such cases, instructions along the actual execution path of the branch need to enter the pipeline for processing. The resulting pipeline bubble results in unproductive processor cycles.

One architectural technique that has been employed to reduce this inefficiency is to delay the effect of the control transfer instruction and to treat an instruction that immediately follows a control transfer instruction as if it logically preceded the delayed control transfer instruction. Instructions that are so treated are often said to reside in the "delay slot" of a "delayed control transfer instruction." In this way, the size of the bubble is reduced (though not necessarily eliminated) and at least some of the otherwise wasted pipeline stages and processing cycles may be used productively.

SPARC instruction set processors traditionally implement an instruction set architecture that contemplates delay slot instructions. SPARC trademarks are used under license and are trademarks or registered trademarks of SPARC International, Inc. in the United States and other countries. Products bearing SPARC trademarks are based upon an architecture developed by Sun Microsystems, Inc.

As a specific example, the SPARC® Version 9 ISA includes five basic control transfer instruction types: a conditional branch, a call and link (CALL), a jump and link (JPML), a return from trap (RETT) and a trap. In the SPARC Version 9 ISA, a delayed control transfer instruction such as a branch, when taken, causes the processor to change control to an instruction at a target address after a one instruction delay. In the usual case, the delay slot instruction (i.e., the instruction following the control transfer instruction) is executed after the control transfer instruction is executed and before control actually transfers to the target of the control transfer instruction.

If the instruction in the delay slot of a DCTI is itself a DCTI, then processing can be more complicated and may be subject to special rules imposed by an instruction set architecture. For example, in SPARC-based architectures a pair of successive DCTIs (i.e., a DCTI couple) is handled as follows. Both control transfer instructions are executed (but not the instruction in the delay slot of the second DCTI) and, assuming that both branches are both taken, control is transferred briefly to the destination of the first and then immediately to the destination of the second. The goal of such a special rule is to simplify processing of what could otherwise be a very complex hierarchy of branch conditions and targets. Other simplifying rules may be employed in other architectures.

In general, when a DCTI couple stradles a cache line boundary, a relatively complex pipeline can be required to ensure a desired instruction fetch behavior. Moreover, even when DCTI couples are encountered that do not cross cache line boundaries, relatively complex processing may be employed to conform processor behavior with special rules imposed by an instruction set architecture.

Due to the increasing operating frequencies of pipelined processors and increased depth of pipelines and speculation characteristic of some modern processor architectures, it can be difficult to design a processor pipeline front-end that can handle (in a timely manner) operations in support of delayed control transfer instructions. In some cases, instruction fetch bandwidth may be adversely affected and pipeline stalls may result. Unfortunately, proper execution of delayed control transfer instructions (including DCTI couples) may be required for instruction set compatibility. In particular, legacy code may exploit DCTI and delay slot instruction code constructs. As a result, it may not be acceptable to alter long-standing instruction set behaviors and conventions, even if such behaviors and conventions tend to limit performance.

What is needed are techniques for reducing the complexity of a processor pipeline front-end while still supporting DCTIs.

SUMMARY

It has been discovered that complexity of a processor pipeline front-end (including fetch sequencing) can be simplified, at least in-part, by deferring enforcement of certain delayed control transfer instruction sequencing constraints or conventions to later stages of an execution pipeline. In some cases, enforcement of such sequencing constraints or conventions may be deferred to one or more pipeline stages associated with commitment or retirement of instructions. In this way, fetching by the pipeline front-end may be simplified when, for example, DCTI couples are encountered in an execution sequence.

These and other aspects of the described invention will be better described with reference to the Brief Description of the Drawings and accompanying Figures.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The description that follows illustrates certain exemplary realizations of processor architectures in accordance with the present invention. In an effort to provide persons of ordinary skill in the art with a clear description of the invented concepts, we have illustrated these concepts using processor architectures of specific design. In particular, in at least some of our descriptive material, we refer to processor designs that incorporate multiple processor cores and/or multiple execution units that may include architectural facilities (including fetch buffers, decode paths, helper arrays, instruction queues, register files, functional units and execution pipelines) replicated on a per-core and/or per-execution pipe basis. In addition, some of our descriptive material is consistent with a particular highly-speculative, highly-pipelined, in-order, multi-core processor design in which extremely large numbers of instructions may be "in flight" at any given time.

In some cases, advantages provided by techniques described herein may be accentuated or of particular significance in such an architecture or implementation. For example, in some cases, simplified sequencing and control may allow a pipeline front-end to more easily and consistently deliver instruction fetch bandwidth sufficient to feed a highly pipelined and/or highly replicated set of execution units.

Nonetheless, techniques of the present invention are more generally applicable. Particular processor architectures illustrated and described are only examples and are in no way critical or essential to exploitation of the invented techniques. Indeed, applicants envision exploitations and/or adaptations for a wide variety of architectures and/or processor implementations, including for processors of comparatively simple design. Based on the description herein, persons of ordinary skill in the art will appreciate a wide range of exploitations for the invented techniques. Accordingly, particular architectural techniques or advantages are detailed to advance understanding of the invented techniques; however, they do not, in general, constitute a limitation on the range of exploitations that fall within the scope of the appended claims. In view of the above, and without limitation, we now describe certain illustrative embodiments.

As used herein, the term "pipeline front-end" identifies a portion or section of a pipeline that is responsible (perhaps amongst other things) for fetching instructions. Such a pipeline front-end may include or be configured as one or more stages and is typically followed by further pipeline sections. The further pipeline stages typically include functionality for decoding, instruction queuing, grouping, execution and/or commitment of instructions or operations. As used herein, a "downstream pipeline section" identifies a portion or section of a pipeline that follows the pipeline front-end, though not necessarily immediately. In accordance with various embodiments of the present invention, we handle certain aspects of delayed control transfer instruction (DCTI) operations, including e.g., enforcement of proper execution sequence control with respect to delay slot and/or DCTI couple conventions of an instruction set architecture, in a downstream pipeline section.

Such a downstream pipeline section may itself include one or more stages and, in some embodiments, may be implemented (at least in part) in commit logic. In this way, the processor may selectively commit results that correspond to those speculatively executed sequences that are consistent with delay slot/DCTI conventions of the instruction set architecture (ISA). Speculatively executed sequences that are not consistent with ISA conventions are simply not committed. Although some "extra" instructions or operations may be fetched and executed, simplification of the pipeline front-end (particularly fetch sequencing control) may, in some processor designs, allow increased fetch bandwidth and increased overall performance.

As noted above, instruction sets that include delayed control transfer instructions (DCTIs) present certain implementation challenges that have been exacerbated as the operating frequencies and complexity of processor pipelines have increased. DCTI couples and, in particular, DCTI couples that span cache line boundaries present challenges. As described herein, the complexity of a processor pipeline front-end can be reduced by handling delay slot instructions in a processor pipeline back-end, e.g., a commit unit, which can step through the instruction sequence following appropriate program counter (PC) and next PC (NPC) rules or conventions.

Figure 1:
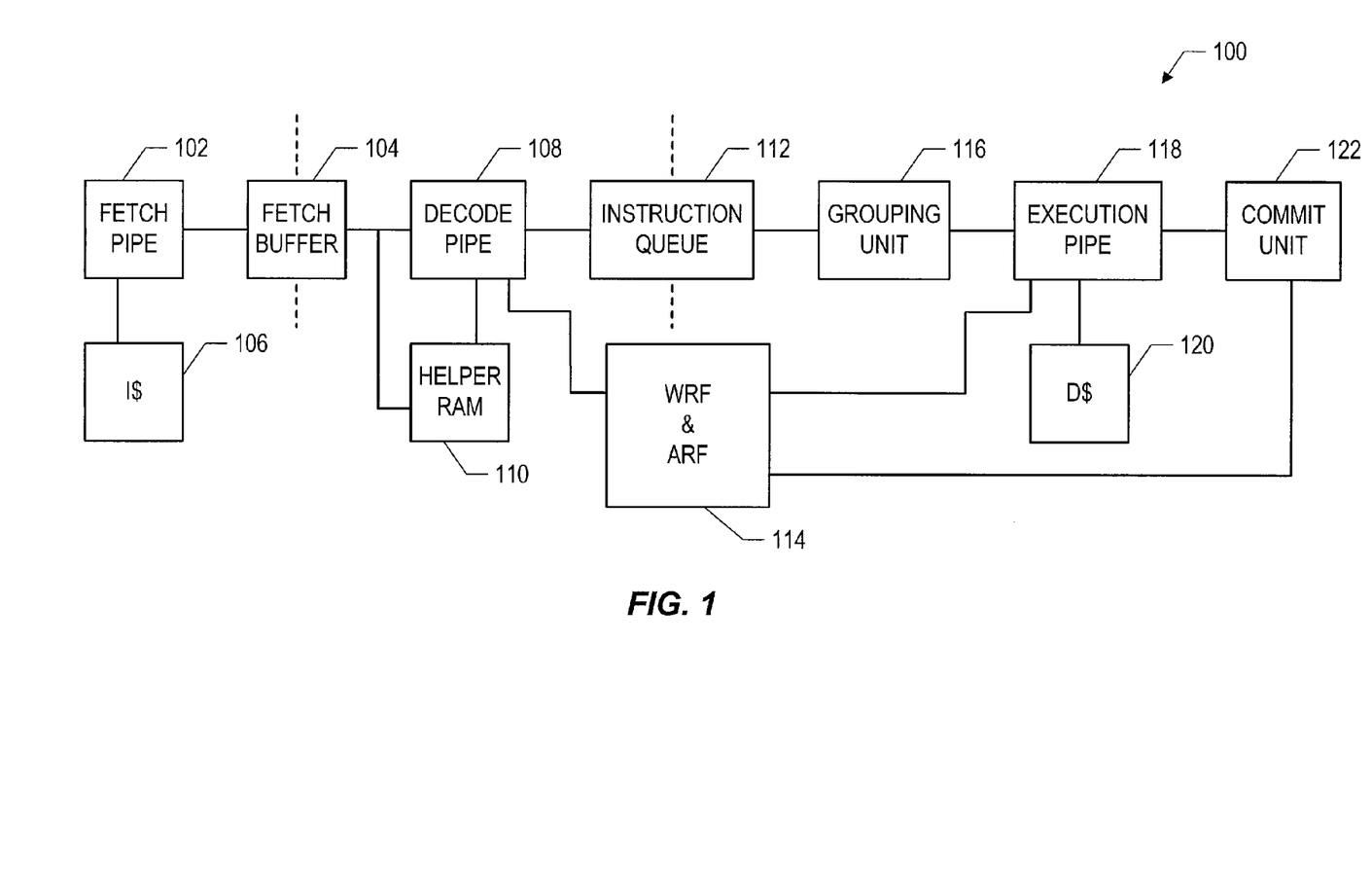
FIG. 1 depicts a relevant portion of an exemplary processor pipeline, constructed according to one embodiment of the present invention.

With reference to FIG. 1, an exemplary processor pipeline 100 is depicted that includes a fetch pipe 102 that is coupled to an instruction store (I$) 106, e.g., a level 1 (L1) cache memory, which may be coupled to a level 2 (L2) cache memory. The fetch pipe 102 may fetch instructions for multiple strands. It should be understood that an exemplary computing apparatus may implement multiple processor cores, e.g., 16 cores, each having multiple processor pipelines, e.g., 4 pipelines per core, on a single integrated circuit (IC) and may include multiple of such ICs. An output of the fetch pipe 102 is provided to a fetch buffer 104, which functions to decouple the fetch pipe 102 from subsequent pipes in the pipeline 100. The fetch buffer 104 may also re-order instructions and may buffer cache lines with predicted taken delayed control transfer instructions (PTDCTI). As is shown in FIG. 1, a helper store 110, e.g., a programmable helper random access memory (RAM), is coupled to an output of the fetch buffer 104. The helper store 110 includes microcoded instructions that provide helper instruction sequences, when appropriate, to a decode pipe 108. In general, the helper store 110 provides a sequence of helper instructions for a complex instruction that, for various reasons, a designer has decided not to implement directly in hardware. Typically, implementations of decode pipe 108 include one or more stages that function to decode instructions. The decode pipe 108 is coupled to the instruction queue 112, which may also serve to decouple the decode pipe 108 from later stages of the pipeline 100.

A register file 114, including a working register file (WRF) and an architectural register file (ARF), is coupled to the decode pipe 108, an execution pipe 118, and a trap and commit unit 122. It should be appreciated that while the WRF and ARF are shown combined, the WRF and ARF may (in some realizations) be implemented as separate structures for each pipeline or as logically distinct portions of an integrated structure. Instructions stored in the instruction queue 112 may be grouped, by grouping unit 116, for execution by the execution pipe 118. The execution pipe 118 is coupled to the commit unit 122, which commits executed instructions to architectural state in the ARF. According to one aspect of the present invention, the commit unit 122 is also configured to determine correct execution of instructions groups including predicted taken DCTIs (PTDCTIs). A data cache 120 is coupled to and provides data to the execution pipe 118.

Figure 2:
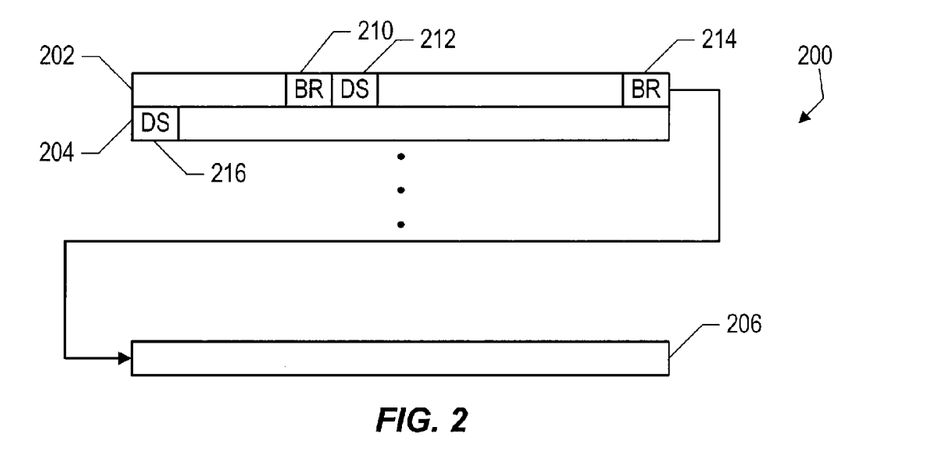
FIG. 2 is a block diagram of a memory structure illustrating certain complexities associated with determining proper instruction execution when a delayed control transfer instruction (DCTI) is a last instruction of a cache line, and an associated delay slot instruction of the DCTI is a first instruction of a next cache line.

With reference to FIG. 2, a memory structure diagram 200 is depicted that includes cache lines 202, 204 and 206 and is intended to demonstrate the complexity of executing an instruction set with at least one delayed control transfer function (DCTI). More specifically, the diagram 200 provides an exemplary illustration of the complexity encountered by a pipeline front-end when a delay slot of a predicted taken DCTI (PTDCTI) is on a different cache line. As is shown, the cache line 202 includes a predicted not-taken branch instruction 210, followed by a delay slot 212 for the instruction 210, and a branch instruction 214, which is located as a last instruction on the cache line 202. As is illustrated, the cache line 204 includes a delay slot 216 for the branch instruction 214.

It should be appreciated that when the branch instruction 214 is a delayed control transfer instruction (DCTI), the delay slot instruction associated with the DCTI may not be readily available, i.e., a cache miss, a translation look-aside buffer (TLB) miss, a memory management unit (MMU) miss or an unmapped page may occur. As is illustrated, the branch instruction 214 is a PTDCTI, which instructs the processor to fetch instructions from cache line 206. It should also be appreciated that a conventional pipeline front-end would generally fetch the cache line 204 (with the delay slot instruction 216), before fetching the cache line 206. According to one aspect of the present invention, the fetch buffer 104 (FIG. 1) is configured to buffer predictions (i.e., PTDCTIs) of a last fetch state. Thus, the prediction is hidden and when the next cache line comes back, the buffered cache line with the PTDCTI is handed back to the fetch pipe 102, at which point the fetch pipe 102 is instructed to fetch instructions from a target address of the instruction 214.

Figure 3:
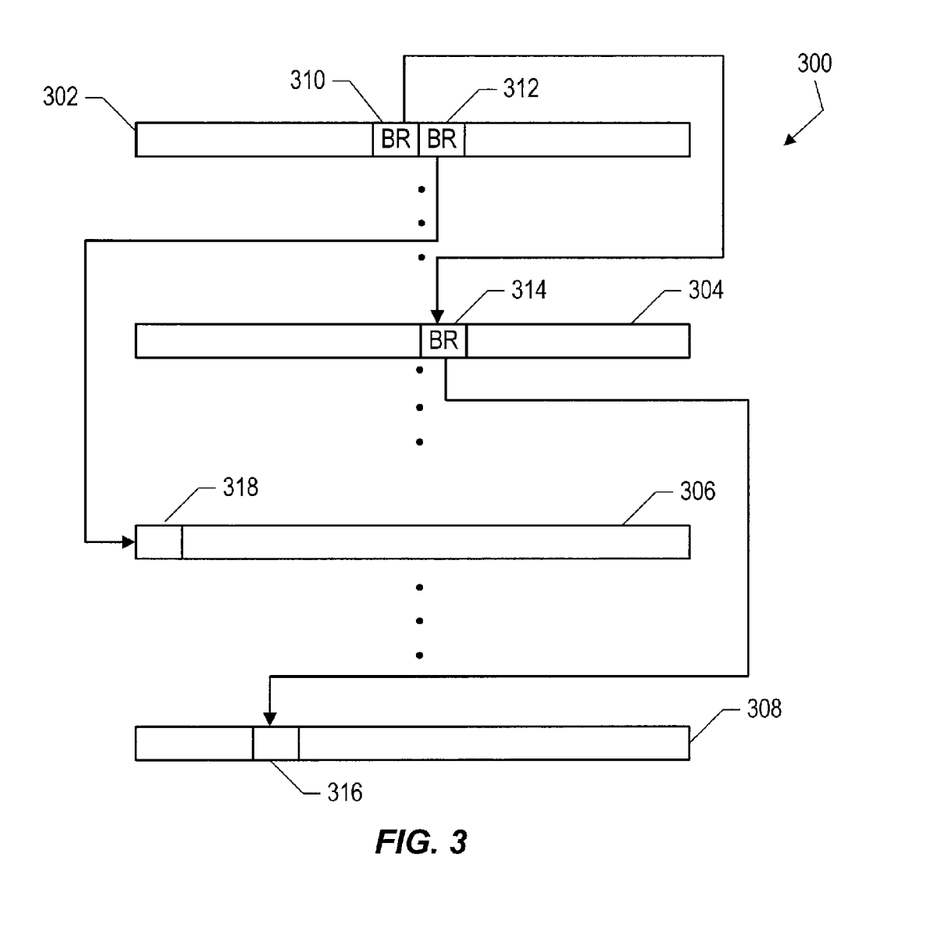
FIG. 3 is a diagram of a memory structure illustrating certain complexities associated with resolving execution order when a DCTI couple occurs in an instruction sequence.

FIG. 3 depicts a memory structure diagram 300 that includes cache lines 302, 304, 306 and 308. The diagram 300 is intended to illustrate the complexity of executing an instruction set with at least one delayed control transfer function (DCTI) where delay slots are not contiguous. More specifically, the diagram 300 provides an exemplary illustration of the complexity encountered by a pipeline front-end when a delay slot of a predicted taken DCTI (PTDCTI) includes a PTDCTI. As is shown, the cache line 302 includes a branch instruction 310, i.e., a PTDCTI, and another branch instruction 312, which is in a delay slot of the instruction 310. The instruction 310 has a branch address to branch instruction 314 (at cache line 304) and the branch instruction 312 has a branch address to a first instruction 318 of cache line 306. The instruction 314 is a predicted taken branch to a branch address of instruction 316, located in cache line 308. Following the rules of PC and NPC, a conventional processor pipeline front-end would itself determine a proper instruction fetching sequence for the instructions 310-316. As noted above, chained delay slots are even more difficult to handle than a DCTI at the end of a cache line and require a relatively complex pipeline front-end to properly determine a proper instruction fetching sequence such that a desired instruction execution order is achieved.

Figure 4:
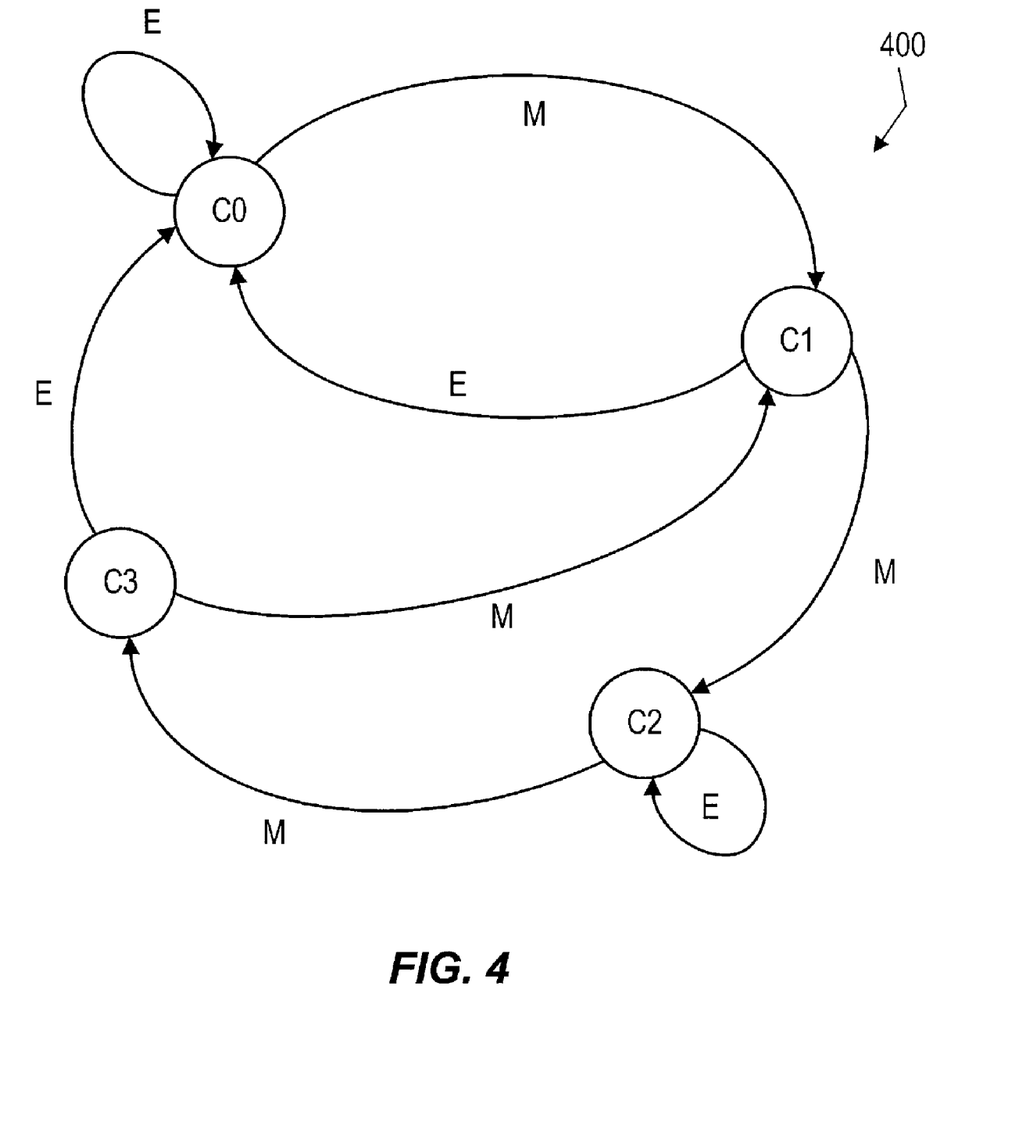
FIG. 4 is an exemplary state diagram of a back-end of a computing apparatus, configured according to one embodiment of the present invention.

In accordance with the present invention, we instead defer enforcement of proper execution sequence ordering to downstream pipeline section(s). FIG. 4 is a state machine diagram 400 of a pipeline back-end (e.g., a commit unit) for handling a predicted taken CTI, which has a delay slot present in an instruction group. In an initial refresh state C0, control transfers to state C1 if a first encountered branch within an instruction group is a PTDCTI ("M"). If the first encountered branch is not a PTDCTI ("E"), control remains in state C0. In state C1, if a second PTDCTI is not encountered within the instruction group, control returns to state C0. Otherwise, when a second PTDCTI is encountered within the instruction group in state C1, control transfers to state C2 where the fetch pipe 104 is cleared and a target of the first encountered branch is redone. In state C2, when the target of the first encountered branch includes a PTDCTI, control transfers to state C3, where the fetch pipe 104 is cleared and a target of the second PTDCTI is redone. When an encountered branch is not a predicted taken DCTI in state C2, control remains in state C2. In state C3, control transfers to state C1 when a PTDCTI is encountered or to state C0 when a PTDCTI is not encountered.

Figure 5:
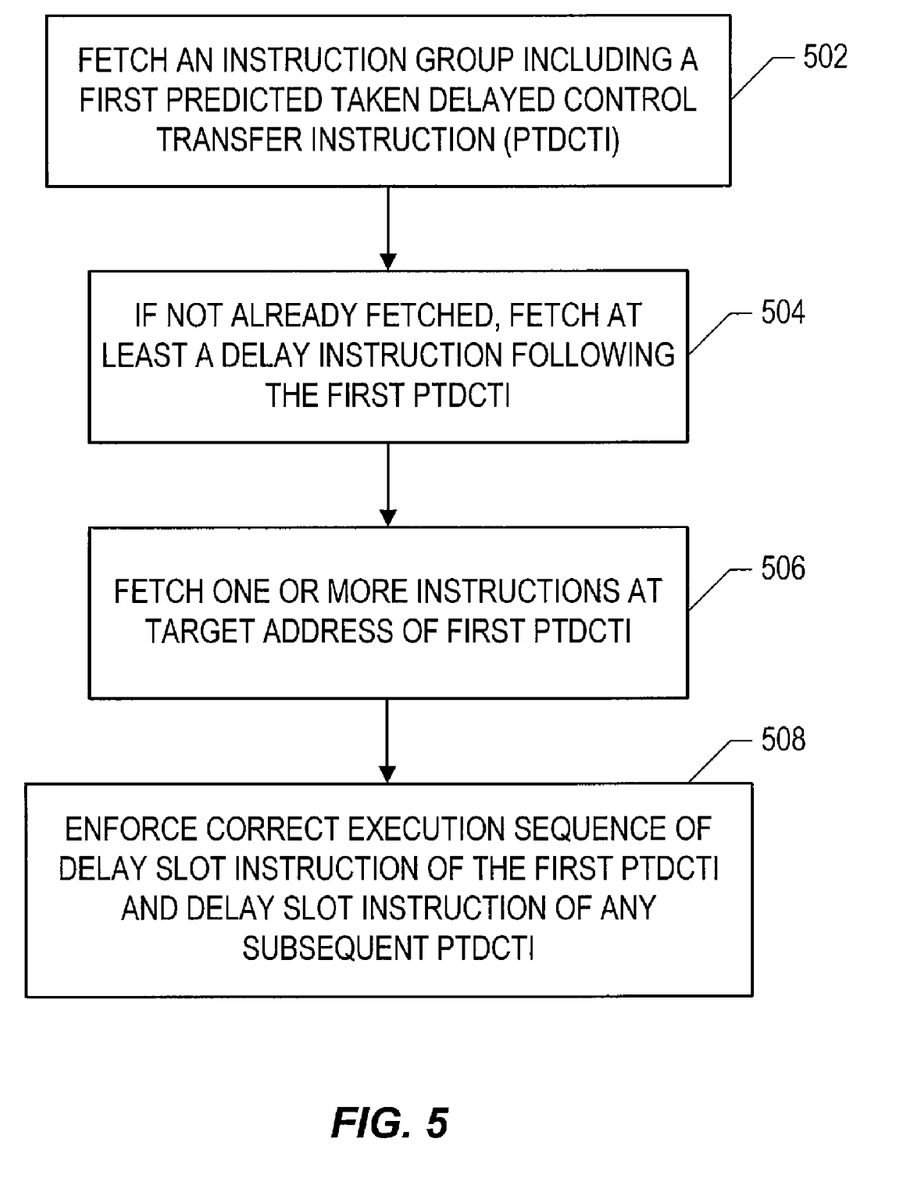
FIG. 5 is a flow diagram depicting a process for handling DCTIs.

With reference to FIG. 5, a process 500 for handling delayed control transfer instructions (DCTIs) is depicted. In block 502, a first PTDCTI is fetched. Next, at block 504 at least a delay instruction following the first PTDCTI is fetched, assuming that the delay instruction was not already within a group of fetched instructions that included the first PTDCTI. Then, in block 506, one or more instructions are fetched at a target address of the first PTDCTI. At block 508, correct execution sequence of the delay slot instruction of the first PTDCTI and the delay slot instruction of any subsequent PTDCTI is enforced by a pipeline back-end, e.g., an architectural commit unit. In this way, fetch sequencing is simplified and enforcement of DCTI execution ordering conventions are instead enforced in a downstream pipeline section.

Figure 6:
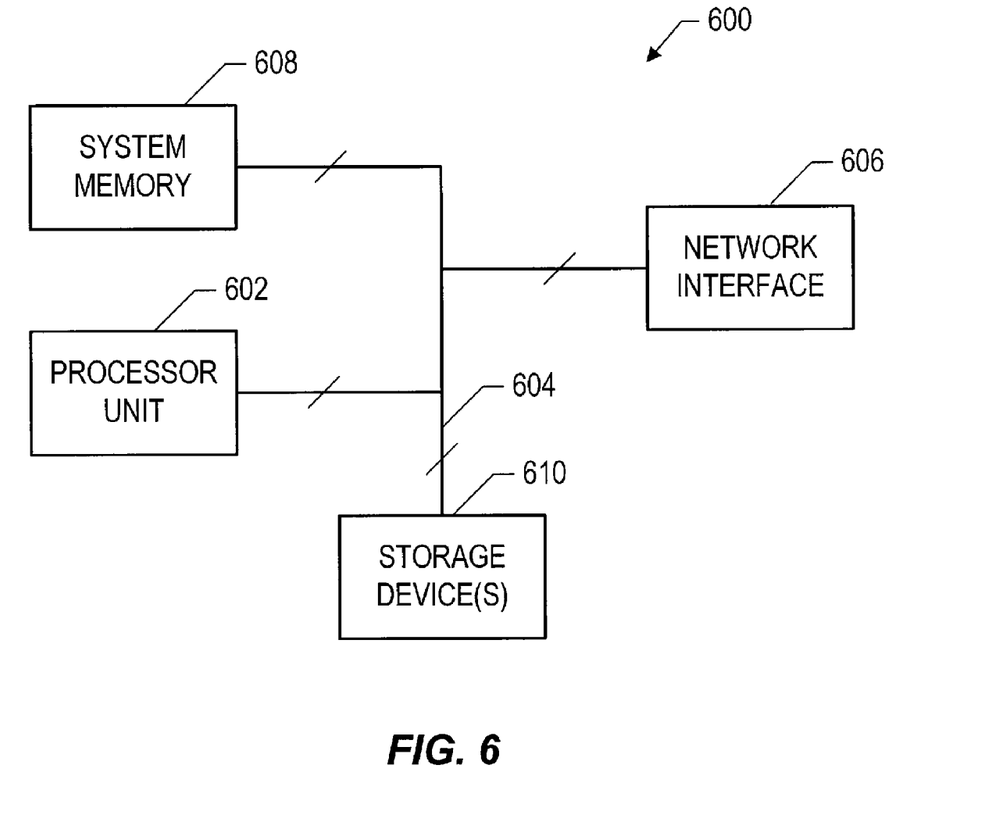
FIG. 6 depicts a block diagram of an exemplary computing apparatus according to one aspect of the present invention.

FIG. 6 depicts an exemplary computer system 600 constructed according to various aspects of the present invention. The computer system 600 includes a processor unit 602, which may include multiple processors, a single threaded processor, a multi-threaded processor, a multi-core processor, etc. that implements one or more of the pipelines 100. The computer system 600 also includes a system memory 608 (e.g., one or more cache levels, SRAM, DRAM, RDRAM, EDO RAM, DDR RAM, and/or EEPROM, etc.), a system bus 604 (e.g., LDT, PCI, ISA, etc.), a network interface 606 (e.g., an ATM interface, an Ethernet interface, a Frame Relay interface, etc.), and storage device(s) 610 (e.g., optical storage, magnetic storage, etc.). Computer system realizations of the invention may include fewer or additional components not illustrated in FIG. 6. For example, the system 600 may also include video cards, audio cards, additional network interfaces, peripheral devices, etc. The processor unit 602, the storage device(s) 610, the network interface 606 and the system memory 608 are coupled to the system bus 604. The processor unit 602 includes the instruction store 106 and a memory interface that couples the instruction store 106 to a memory hierarchy, i.e., the system memory 608. A computing apparatus constructed according to one or more embodiments of the present invention may be embodied as a processor integrated circuit or as one or more computer readable storage media encoding a design file representation of the computing apparatus.

While the invention has been described with reference to various realizations, it will be understood that these realizations are illustrative and that the scope of the invention is not limited to them. Many variations, modifications, additions, and improvements are possible. More generally, realizations in accordance with the present invention have been described in the context of particular realizations. For example, the blocks and logic units identified in the description are for understanding the described invention and not meant to limit the described invention. Functionality may be separated or combined in blocks differently in various realizations of the invention or described with different terminology. As used herein, plural instances may be provided for components described herein as a single instance. These and other variations, modifications, additions, and improvements may fall within the scope of the invention as defined in the claims that follow.

While circuits and physical structures are generally presumed, it is well recognized that in modern semiconductor design and fabrication, physical structures and circuits may be embodied in computer-readable descriptive form suitable for use in subsequent design, test or fabrication stages. Structures and functionality presented as discrete components in the exemplary configurations may be implemented as a combined structure or component. The invention is contemplated to include circuits, systems of circuits, related methods, and computer-readable medium encodings of such circuits, systems, and methods, all as described herein, and as defined in the appended claims. As used herein, a computer-readable medium includes at least disk, tape, or other magnetic, optical, semiconductor (e.g., flash memory cards, ROM). In some cases, encodings may be transmitted using a network, wireline, wireless or other communications medium.

The description of the invention set forth herein is illustrative, and is not intended to limit the scope of the invention as set forth in the following claims. For example, while the invention has been described in an embodiment in which a particular speculative, in-order multi-core architecture is described, one of skill in the art will appreciate that the teachings herein can be utilized with other architectures. Variations and modifications of the embodiments disclosed herein may be made based on the description set forth herein, without departing from the scope and spirit of the invention as set forth in the following claims.

What is claimed is:

1. A computing apparatus configured to execute an instruction set that includes at least one delayed control transfer type instruction (DCTI), the computing apparatus comprising:
   a pipeline front-end for fetching instructions from an instruction store without regard to an architecturally-defined special branching behavior for program sequences that include a second DCTI in a delay slot of a first DCTI, wherein the pipeline front-end lacks capability to determine proper execution order for nested DCTIs within fetched groups of instructions; and
   a downstream pipeline section configured (i) to identify in a speculatively executed instruction sequence including at least one subsequence that is inconsistent with the architecturally-defined special branching behavior, the at least one subsequence containing the second DCTI in the delay slot of the first DCTI, and (ii) to enforce the architecturally-defined special branching behavior wherein said downstream pipeline section is located in the pipeline after an execution section.

2. The computing apparatus of claim 1,
   wherein the downstream pipeline section includes a commit stage for committing executed instructions to architectural state, the commit stage enforcing the architecturally-defined special branching behavior.

3. The computing apparatus of claim 1,
   wherein the pipeline front-end lacks capability to determine proper execution order for DCTI couples within fetched groups of instructions.

4. The computing apparatus of claim 1,
   wherein the architecturally-defined special branching behavior includes a requirement that, for an instruction sequence that contains a DCTI couple, for which both branches are at least predicted taken, control is transferred briefly to the target of the first DCTI of the couple and then to the target of the second.

5. The computing apparatus of claim 1,
   wherein the downstream pipeline section, upon detecting nested predicted taken DCTIs, is configured to determine proper instruction execution order and to cause the pipeline front-end to fetch additional instruction groups accordingly.

6. The computing apparatus of claim 1,
   wherein the downstream pipeline section, upon detecting a second consecutive predicted taken DCTI, is configured to determine a proper next program counter (NPC) value and to cause the pipeline front end to fetch a next instruction at an address indicated by the NPC.

7. The computing apparatus of claim 1,
   wherein the downstream pipeline section, upon detecting a second consecutive predicted taken DCTI, is configured to step through a group of successive instructions until a predetermined number of consecutive instructions other than DCTIs are executed, by successively determining a next program counter (NPC) value for each stepped instruction and causing the pipeline front-end to fetch an instruction at an address indicated by the NPC.

8. The computing apparatus of claim 1, configured as a multiple instruction issue, in-order issue processor.

9. The computing apparatus of claim 1, further comprising:
   multiple execution pipelines sharing the pipeline front-end, each execution pipeline comprising at least one fetch buffer for storing one or more groups of fetched instructions.

10. The computing apparatus of claim 1, embodied as a multi-core processor integrated circuit.

11. The computing apparatus of claim 1, embodied as one or more computer readable storage media encoding a design file representation of a processor integrated circuit.

12. The computing apparatus of claim 1, embodied as a computer system and further comprising:
    a memory interface coupled to the instruction store; and
    a memory hierarchy coupled to the memory interface.

13. A multi-core processor comprising:
    plural implemented cores sharing a front-end section that fetches instructions, without regard to an architecturally-defined special branching behavior for program sequences that include a second DCTI in a delay slot of a first DCTI, to be executed in functional units of the cores, wherein the front-end section lacks capability to determine proper execution order for nested delayed control transfer type instructions (DCTIs) within fetched groups of instructions; and
    commit logic (i) to identify in a speculatively executed instruction sequence including at least one subsequence that is inconsistent with an instruction set defined special branching behavior, the at least one subsequence containing a second DCTI in a delay slot of a first DCTI, and (ii) to enforce the instruction set defined special branching behavior for the at least one subsequence rather than in fetch sequencing logic of the front-end section.

14. The multi-core processor of claim 13, further comprising:
    an instruction store from which the front-end section fetches instructions.

15. The multi-core processor of claim 13,
    wherein the front-end section fetches instructions without regard to the instruction set defined special branching behavior.

16. The multi-core processor of claim 13, in combination with, and coupled to, a memory hierarchy in which the first and second DCTIs span a cache line boundary.

17. A method of operating a processor configured to execute an instruction set that includes at least one delayed control transfer type instruction (DCTI), the method comprising:

fetching instructions from an instruction store without regard to an architecturally-defined special branching behavior for program sequences that include a second DCTI in a delay slot of a first DCTI, wherein a pipeline front-end section that fetches the instructions lacks capability to determine proper execution order for nested DCTIs within fetched groups of instructions;

speculatively executing instruction sequences including at least one subsequence that is inconsistent with the architecturally-defined special branching behavior; and identifying in the speculatively executed instruction sequences, a subsequence containing the second DCTI in the delay slot of the first DCTI and enforcing the architecturally-defined special branching behavior wherein said identifying and enforcement is performed in a pipeline section located in the pipeline after an execution section.

18. The method of claim 17, further comprising:
selectively committing executed instructions to architectural state in a commit stage of the processor, the commit stage enforcing the architecturally-defined special branching behavior.

19. The method of claim 17, further comprising:
directing further fetching of instructions from the instruction store based on results of the post-speculative execution enforcement of the architecturally-defined special branching behavior.

* * * * *